(12) United States Patent
Saillet et al.

(10) Patent No.: US 11,461,135 B2
(45) Date of Patent: Oct. 4, 2022

(54) DYNAMICALLY MODIFYING THE PARALLELISM OF A TASK IN A PIPELINE

(71) Applicant: International Business Machines Corporation, Armonk, NY (US)

(72) Inventors: Yannick Saillet, Stuttgart (DE); Namit Kabra, Hyderabad (IN); Ritesh Kumar Gupta, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 16/663,428

(22) Filed: Oct. 25, 2019

(65) Prior Publication Data

US 2021/0124611 A1 Apr. 29, 2021

(51) Int. Cl.
*G06F 9/46* (2006.01)
*G06F 9/48* (2006.01)
*G06N 20/00* (2019.01)

(52) U.S. Cl.
CPC .......... *G06F 9/4887* (2013.01); *G06N 20/00* (2019.01)

(58) Field of Classification Search
CPC ......... G06F 9/4887; G06N 20/00; G06N 5/04
See application file for complete search history.

(56) References Cited

U.S. PATENT DOCUMENTS

| | | | |
|---|---|---|---|
| 6,009,265 A | 12/1999 | Huang | |
| 7,272,704 B1 | 9/2007 | Nguyen | |
| 10,338,942 B2 | 7/2019 | Chambers | |
| 2009/0077561 A1 | 3/2009 | Feng | |
| 2014/0282570 A1 | 9/2014 | Prasanna | |
| 2015/0089192 A1 | 3/2015 | Gonion | |
| 2018/0329956 A1 | 11/2018 | Mittal | |

FOREIGN PATENT DOCUMENTS

| | | |
|---|---|---|
| CN | 108182281 A | 6/2018 |
| CN | 114556299 A | 5/2022 |
| WO | 2021079285 A1 | 4/2021 |

OTHER PUBLICATIONS

International Search Report and Written Opinion, International Application No. PCT/IB2020/059894, International Filing Date Oct. 21, 2020.
Apache Spark, "Job Scheduling", Spark, 2.4.4, accessed on Sep. 12, 2019, 6 pages, <http://spark.apache.org/docs/latest/job-scheduling.html#dynamic-resource-allocation>.
Crecana et al., "Monitoring-based Auto-Scalability Across Hybrid Clouds", SAC 2018, Apr. 9-13, 2018, Pau, France, © 2018 Association for Computing Machinery, 8 pages.
(Continued)

*Primary Examiner* — Gregory A Kessler
(74) *Attorney, Agent, or Firm* — Michael A. Petrocelli

(57) ABSTRACT

In an approach to dynamically identifying and modifying the parallelism of a particular task in a pipeline, the optimal execution time of each stage in a dynamic pipeline is calculated. The actual execution time of each stage in the dynamic pipeline is measured. Whether the actual time of completion of the data processing job will exceed a threshold is determined. If it is determined that the actual time of completion of the data processing job will exceed the threshold, then additional instances of the stages are created.

18 Claims, 6 Drawing Sheets

(56) References Cited

OTHER PUBLICATIONS

Najvar, P., "Data Partitioning: An Elegant Way To Parallelize Transformations Without Branching", CloverDX, Posted on Jun. 22, 2016, 11 pages, <https://blog.cloverdx.com/data-partitioning-parallelize-transformations>.

Sattler et al., "Towards Elastic Stream Processing: Patterns and Infrastructure", Ceur Workshop Proceedings, Riva del Garda, Italy, Aug. 30, 2013, pp. 49-54.

Shah et al., "Flux: An Adaptive Partitioning Operator for Continuous Query Systems", Computer Science Division (EECS), Report No. UCB/CSD-2-1205, Oct. 2002, University of California, 16 pages.

Simitsis et al., "Optimizing Analytic Data Flows for Multiple Execution Engines", SIGMOD '12, May 20-24, 2012, Scottsdale, Arizona, © Copyright 2012 ACM, 12 pages.

Viglas et al., "Rate-Based Query Optimization for Streaming Information Sources", SIGMOD'2002, Jun. 4-6, Madison, Wisconsin, © Copyright 2002 ACM, 12 pages.

Saillet, et al., "Dynamically Modifying the Parallelism of a Task in a Pipeline", Germany Application No. 11 2020 004 116.6, International Filing Date Oct. 21, 2020, 76 pages.

Saillet, et al., "Dynamically Modifying the Parallelism of a Task in a Pipeline", United Kingdom Application No. GB2207492.6, International Filing Date Oct. 21, 2020, 30 pages.

DYNAMICALLY MODIFYING THE PARALLELISM OF A TASK IN A PIPELINE

BACKGROUND

The present invention relates generally to the field of using pipeline instructions, and more particularly to dynamically identifying and modifying the parallelism of a particular task in a pipeline.

In computing, a pipeline is a set of data processing elements connected in series, where the output of one stage is the input of the next stage. Processing pipelines are conceptually executed in parallel, with the output stream of one stage being automatically fed as the input stream of the next stage. For example, the Linux system call pipe is a classic example of this concept.

Since the throughput of a pipeline cannot be better than that of its slowest element, designers try to divide the work and resources among the stages so that each stage takes the same amount of time to complete its task. If a stage takes longer than the other stages, the designer can provide two or more processing elements to carry out that stage in parallel, with a single input buffer feeding all instances of that stage, and a single output buffer receiving the results of all instances of that stage. As each instance of a pipeline stage finishes processing its current data item, it delivers the results to the common output buffer of that stage, and takes the next data item from the common input buffer of that stage.

The current state of art has limitations. Typically the number of partitions and parallelism of a task (or job or run) is decided at the beginning of the execution. There has been some research on dynamically spanning more processes for critical resources. The problem is determining how much parallelism would improve performance without becoming cost prohibitive. For example, parallelism in a sorting operation may not be very helpful, whereas for some other operation additional parallelism will be helpful. Note that often the delays are based on the workload and therefore often the best configuration cannot be predicted at the beginning of the job. Currently there is no prior art to predict or suggest a good starting configuration for the parallelism of the data pipeline. In the current state of the art, machine learning has not been exploited to optimize the use of parallelism. Another area that is not addressed in the current state of the art is guaranteeing the Quality of Service (QoS) of a job, as many Service Level Agreements (SLAs) include QoS terms that must be met.

SUMMARY

Embodiments of the present invention disclose a method, a computer program product, and a system for dynamically identifying and modifying the parallelism of a particular task in a pipeline. In one embodiment, the optimal execution time of each stage in a dynamic pipeline is calculated. The actual execution time of each stage in the dynamic pipeline is measured. Whether the actual time of completion of the data processing job will exceed a threshold is determined. If it is determined that the actual time of completion of the data processing job will exceed the threshold, then additional instances of the stages are created.

In one embodiment, whether sufficient resources are available to spawn one or more new instances of the pipeline stages causing the quality of service to be negatively impacted is determined. Responsive to determining that sufficient resources are available to spawn one or more new instances of the pipeline stages, the new instances of the pipeline stages are spawned. The pipeline data is partitioned to the new instances of the pipeline stages.

In one embodiment, throughput of the first one or more new instances of the one or more pipeline stages is measured. Whether the throughput of the new instances of the pipeline stages has increased is determined. Responsive to determining that the throughput of the new instances of the pipeline stages has increased, additional new instances of the pipeline stages are spawned.

In one embodiment, throughput of the first one or more new instances of the one or more pipeline stages is measured. Whether the throughput of the new instances of the pipeline stages has increased is determined. Responsive to determining that the throughput of the new instances of the pipeline stages has not increased, the new instances of the pipeline stages are removed. The current configuration of the dynamic pipeline for the data processing job is stored. A decision tree model to predict the behavior of the dynamic pipeline for the data processing job is trained.

DETAILED DESCRIPTION

Figure 1:
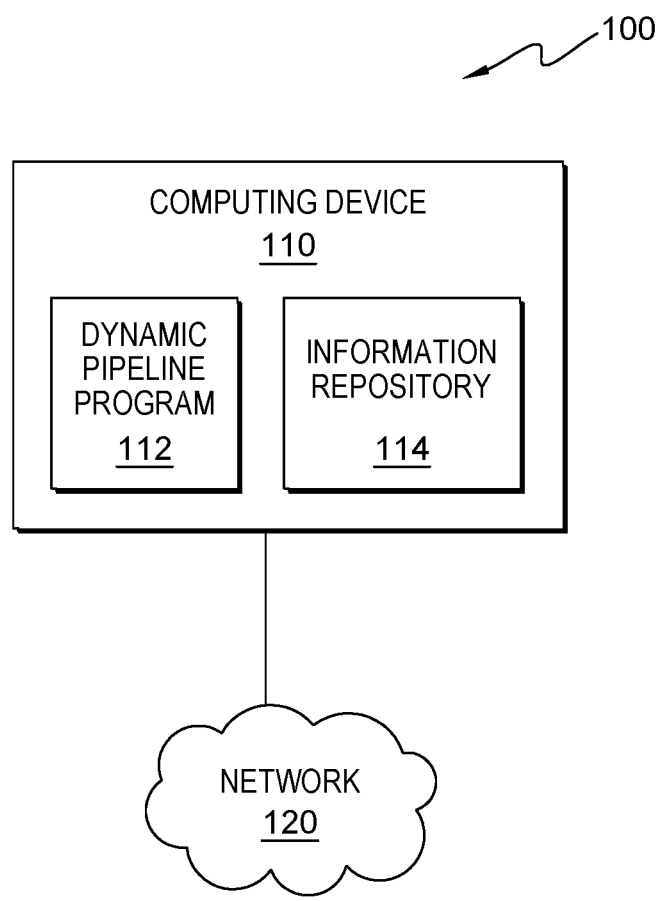
FIG. 1 is a functional block diagram illustrating a distributed data processing environment, in accordance with an embodiment of the present invention.

A pipeline, also known as a data pipeline or data processing pipeline, is a set of data processing operations connected in series, where the output of one operation is the input of the next one. The elements of a pipeline are often executed in parallel or in time-sliced fashion. Data processing workflows consists of several processing operators where stage X processes the output of stage X−1 and passes its output to stage X+1. Based on factors such as the input load and the terms of SLAs, the amount of parallelism is pre-defined for a particular workflow.

The current state of art has limitations. Typically the number of partitions and parallelism of a task (or job or run) is decided at the beginning of the execution. There has been some research on dynamically spanning more processes for critical resources. The problem is determining how much parallelism would improve performance without becoming cost prohibitive. For example, parallelism in a sorting operation may not be very helpful, whereas for some other operation additional parallelism will be helpful. In the current state of the art, machine learning has not been exploited to optimize the use of parallelism.

Another area that is not addressed in the current state of the art is guaranteeing the QoS of a job, as many SLAs include QoS terms that must be met. For example, a common type of operation that may be subject to QoS terms in an SLA is an extract, transform, load (ETL) job, which is normally time critical. Note that often the performance delays of the intermediate stages are based on the workload, so the best configuration cannot be predicted at the beginning of the job. If the time that a service takes is exceeding the expected limit, then re-writing the job dynamically (by increasing or decreasing parallelism) for the intermediate stages can lead to performance increases to meet the QoS terms in the SLA.

Additionally, there is no prior art to predict or suggest a good starting configuration for the parallelism of the data pipeline. For example, a data quality (data processing) workflow is taking more time than expected to find duplicate data in the job. This extra time threatens the QoS terms in the SLA. It is unknown if increasing the parallelism of the entire job, or just a particular stage, will be beneficial. In the current state of the art, the decision of how many parallel stages to use was made at the time of creating the job, and cannot be changed. The solution is to use machine learning, whereby the details of past runs can be accumulated to predict the amount of parallelism for each operator (within a task) that balances increased performance and available resources. Based on the past runs of these tasks, a machine learning model can be created to predict how a particular operation behaves when it is upscaled (more parallel instances added to a stage) or downscaled (parallel instances removed from a stage). Based on the predicted behavior, some of the operations can be upscaled or downscaled to meet the QoS terms of the SLA. As a result, the parallelism of the job or stage is optimally modified without requiring a restart, as is required in the current state of the art. In the preferred embodiment, a data processing workflow is triggered, and the system will automatically modify the parallelism of each individual operator irrespective of parallelism of other the operators in the workflow based on availability of system resources.

FIG. 1 is a functional block diagram illustrating a distributed data processing environment, generally designated 100, suitable for operation of dynamic pipeline program 112, in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes dynamic pipeline program 112. In an embodiment, dynamic pipeline program 112 is a program, application, or subprogram of a larger program for dynamically identifying and modifying the parallelism of a particular task in a pipeline in distributed row-based database systems. In an alternative embodiment, dynamic pipeline program 112 may be located on any other device accessible by computing device 110 via network 120.

In an embodiment, computing device 110 includes information repository 114. In an embodiment, information repository 114 may be managed by dynamic pipeline program 112. In an alternate embodiment, information repository 114 may be managed by the operating system of the device, alone, or together with, dynamic pipeline program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, client data, configuration data, database data, machine learning models, and other data that is received by dynamic pipeline program 112 from one or more sources, and data that is created by dynamic pipeline program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an SQL database, a NoSQL database, an object-oriented database, or one or more tables.

Figure 2:
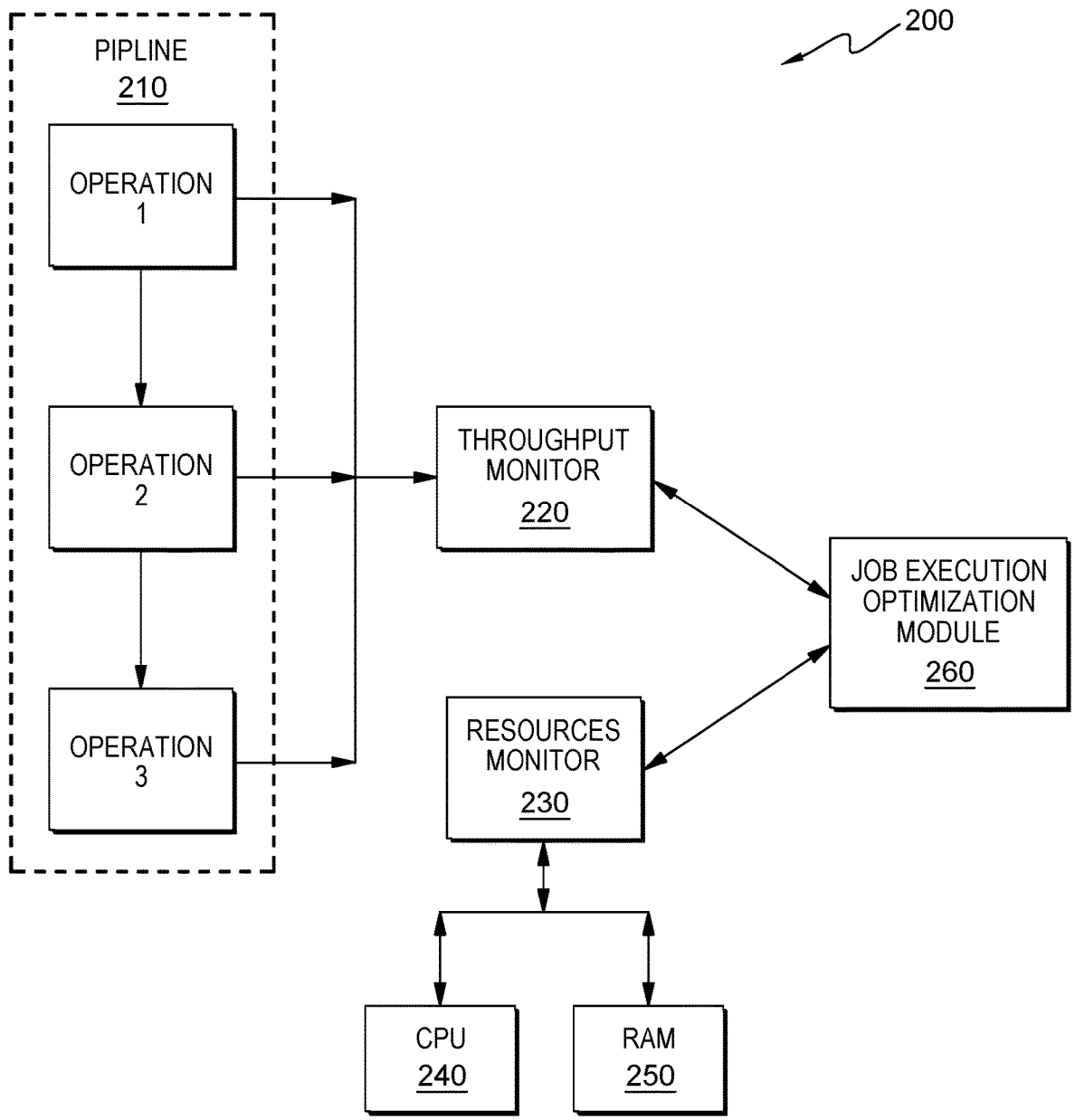
FIG. 2 is an example of a pipeline data flow model, in accordance with an embodiment of the present invention.

FIG. 2 is an example of a pipeline data flow model, generally designated 200, in accordance with an embodiment of the present invention. In an embodiment, the dynamic pipeline contains a plurality of stages. In the example illustrated in FIG. 2, the dynamic pipeline contains three stages, for illustration only. It should be noted that this figure is provided for illustrative purposes only. Many modifications and variations will be apparent to those of ordinary skill in the art without departing from the scope and spirit of the invention.

FIG. 2 includes pipeline 210, throughput monitor 220, resources monitor 230, CPU 240, RAM 250, and job execution optimization module 260.

In the embodiment illustrated in FIG. 2, pipeline 210 is an example of a section of a pipeline showing three operation stages. In the illustrated embodiment, operation 1, operation 2, and operation 3 are three operation stages of a longer pipeline. For example, operation 1 would receive its input from a prior pipeline stage (unless operation 1 is the first stage of the pipeline), while operation 3 would send its output to a subsequent pipeline stage (unless operation 3 is the last stage of the pipeline). In an embodiment, there can be any number of stages in the pipeline.

In the embodiment illustrated in FIG. 2, throughput monitor 220 is an example of a module created by dynamic pipeline program 112 that monitors the stages of the pipeline to detect a performance bottleneck. The operation of throughput monitor 220 is explained below (see step 502 in FIG. 5).

In the embodiment illustrated in FIG. 2, resources monitor 230 is an example of a module created by dynamic pipeline program 112 that monitors the available resources, for example, CPU 240 and RAM 250. The operation of resources monitor 230 is explained below (see step 504 in FIG. 5).

In the embodiment illustrated in FIG. 2, CPU 240 is a sample processor in the system. In an embodiment, computing device 110 may have any number of processors, any of which that are involved in the operation of pipeline 210 are monitored by resources monitor 230. CPU 240 is a representation of all the processors that are monitored by resources monitor 230.

In the embodiment illustrated in FIG. 2, RAM 250 is a sample memory in the system. In an embodiment, computing device 110 may have any number of RAMs, or other forms of memory, any of which that are involved in the operation of pipeline 210 are monitored by resources monitor 230. RAM 250 is a representation of all the RAMs, or other forms of memory, that are monitored by resources monitor 230.

Figure 5:
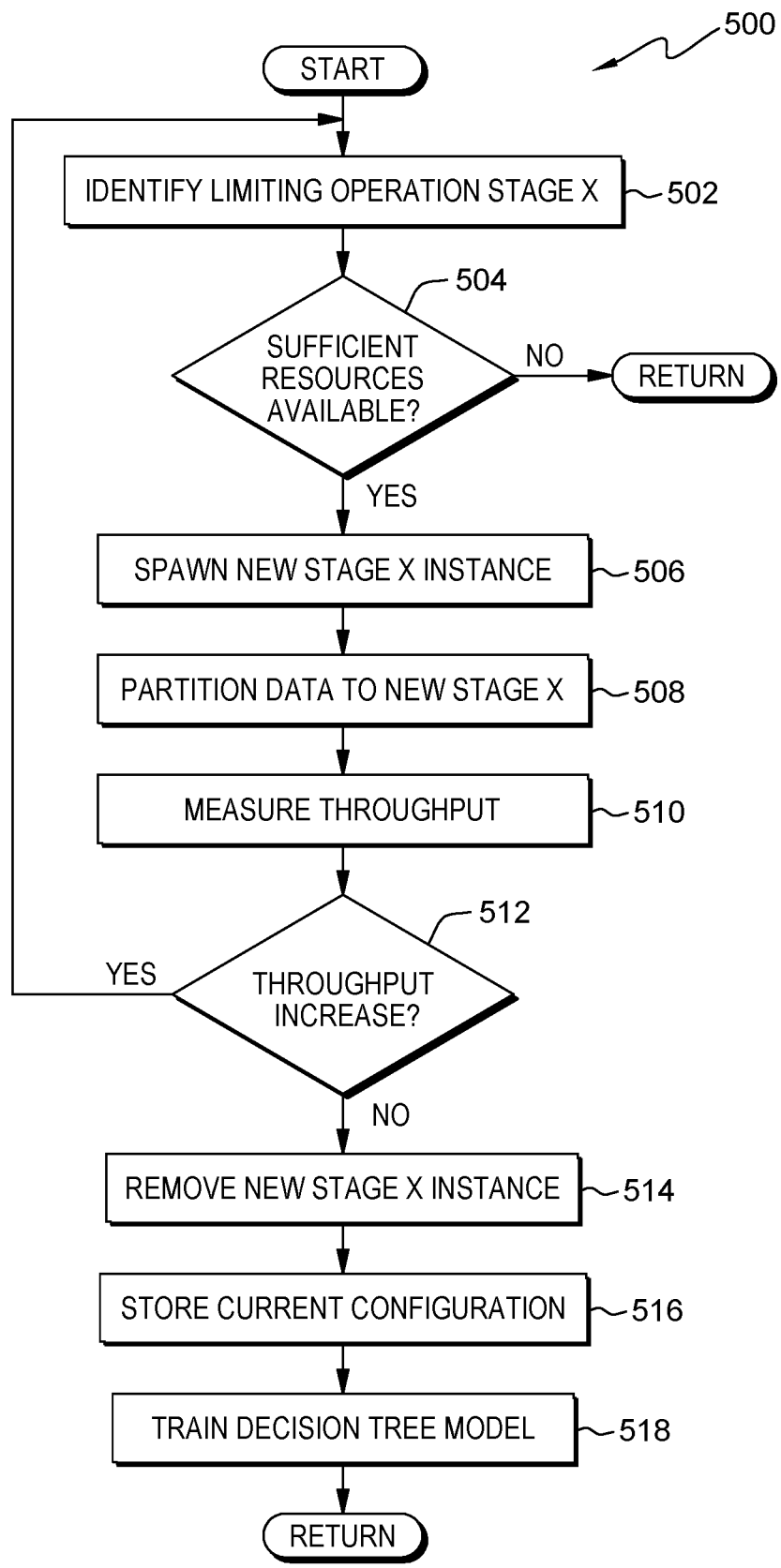
FIG. 5 is a flowchart depicting operational steps of the intelligent spawning of additional instances in step 416 of the flowchart in FIG. 4, on a computing device within the distributed data processing environment of FIG. 1, for dynamically identifying and modifying the parallelism of a particular task in a pipeline, in accordance with an embodiment of the present invention.

In the embodiment illustrated in FIG. 2, job execution optimization module 260 is an example of a module created by dynamic pipeline program 112 that takes the output of the performance bottlenecks from throughput monitor 220 and resource availability data from resources monitor 230, and adds or subtracts parallel stages to each operation in the pipeline to maximize performance and meet QoS requirements. The operation of resources monitor 230 is explained below (for example, all steps of FIG. 5 are controlled by job execution optimization module 260).

Figure 3A:
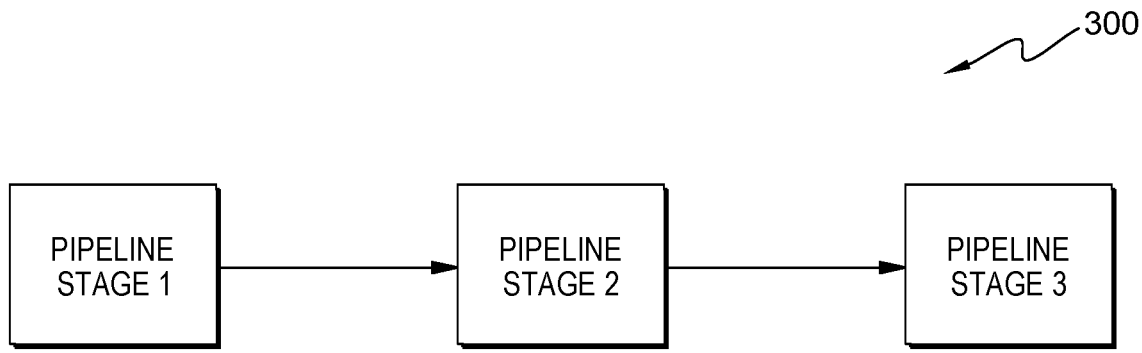
FIG. 3a is an example of the initial configuration of a 3-stage pipeline in operation, in accordance with an embodiment of the present invention.
Figure 3B:
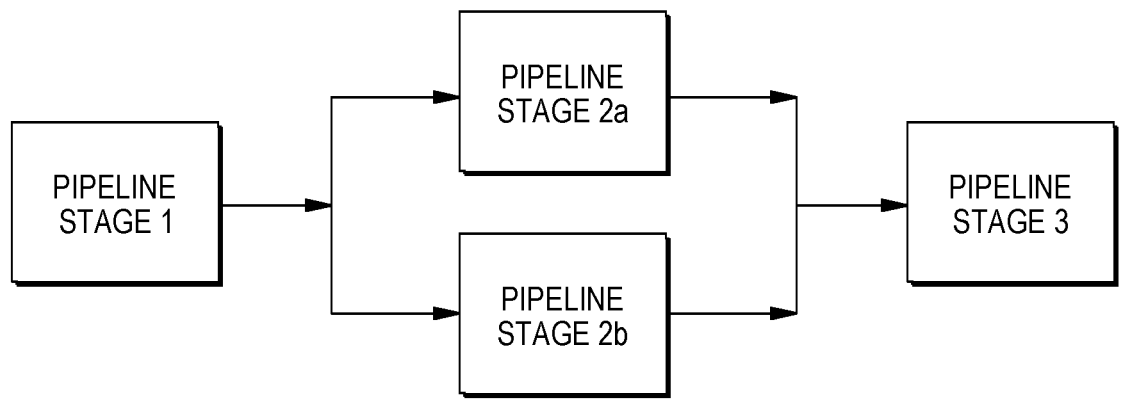
FIG. 3b is an example of an intermediate configuration of a 3-stage pipeline in operation, in accordance with an embodiment of the present invention.
Figure 3C:
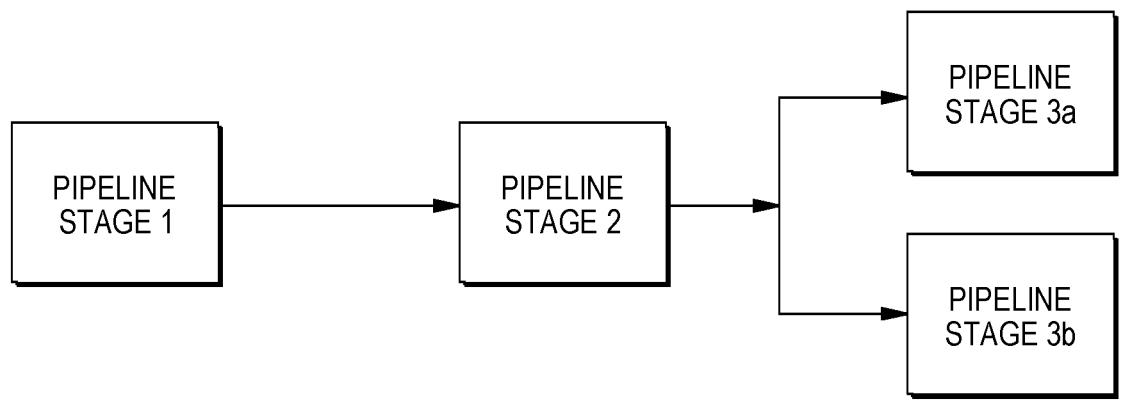
FIG. 3c is an example of another intermediate configuration of a 3-stage pipeline in operation, in accordance with an embodiment of the present invention.

FIGS. 3a through 3c illustrate an example of the steps that dynamic pipeline program 112 takes to maximize performance and meet QoS requirements, generally designated 300, in accordance with an embodiment of the present invention.

FIG. 3a is an example of the initial configuration of a three-stage pipeline with a single task per stage.

In FIG. 3b, dynamic pipeline program 112 has detected a slowdown in the pipeline at stage 2 and has therefore added a second instance to stage 2, denoted now as pipeline stage 2a and pipeline stage 2b. In an embodiment, during a normal data pipeline execution, job execution optimization module 260 determines, based on input from throughput monitor 220, that pipeline stage 2 is lagging in its processing. Job execution optimization module 260 checks with resource monitor 230 to determine if sufficient system resources are available to support additional instances of pipeline stage 2. If so, job execution optimization module 260 creates an additional instance of stage 2 (pipeline stage 2b in this example).

The new instance of stage 2 is registered to allow pipeline stage 1 to send its output to both pipeline stage 2a and pipeline stage 2b. In an embodiment, dynamic pipeline program 112 partitions the output of Stage 1 using an algorithm to distribute the records coming from stage 1 to the different instances of stage 2 essentially equally. For example, in an embodiment, dynamic pipeline program 112 may use hashing to distribute the results of pipeline stage 1 to both pipeline stage 2a and pipeline stage 2b. Hash partitioning computes a hash value (an integer number) for the row, and computes the modulo of the computed hash value with the number of rows to determine the partition number that should handle that record. The hash value is computed in such a way that it is randomly distributed, thereby ensuring that each partition receives approximately the same amount of records. In another example, dynamic pipeline program 112 may use a round-robin algorithm, where the first row is issued to partition 1, the second row is issued to partition 2, . . . the N+1 row is issued to partition 1, etc. In another embodiment, dynamic pipeline program 112 may use any other appropriate algorithm as would be apparent to those skilled in the art to distribute the output from pipeline stage 1 to the two instances of pipeline stage 2, i.e., stage 2a and stage 2b.

The new instance (pipeline stage 2b) starts getting a slice of data from pipeline stage 1, which reduces the processing load on pipeline stage 2a. If the throughput increases, this indicates that adding the new instance of pipeline stage 2 was a correct choice. If greater performance is required, job execution optimization module 260 creates additional new instances of pipeline stage 2 to adjust performance with the processing load. Based on the improved performance of the pipeline, this configuration is stored as a good starting point for the next execution of this particular pipeline.

Based on the data gathered in FIG. 3b above, dynamic pipeline program 112 trains a decision tree model to predict the behavior of an operator based on any of operator type, throughput, input operator, or output operator (which were captured in FIG. 3b above). From this training, dynamic pipeline program 112 predicts which operators will benefit from upscaling or downscaling based on these parameters. Therefore, rather than being randomly chosen, the upscaling or downscaling predictions will be based on the created model.

FIG. 3c further illustrates the example of FIG. 3b above. In FIG. 3c, dynamic pipeline program 112 has detected a slowdown in the pipeline at stage 3, and has therefore added a second instance to stage 3, denoted now as pipeline stage 3a and pipeline stage 3b. In addition, dynamic pipeline program 112 has detected that pipeline at stage 2 is now exceeding the throughput of pipeline stage 1 and pipeline stage 3, and therefore dynamic pipeline program 112 has removed the second instance of pipeline stage 2 to free the resources for other tasks. In another example, dynamic pipeline program 112 has determined, based on input from resources monitor 230, that the system requires more resources for other tasks, and therefore dynamic pipeline program 112 has removed the second instance of pipeline stage 2 to free the resources for the other tasks.

Figure 4:
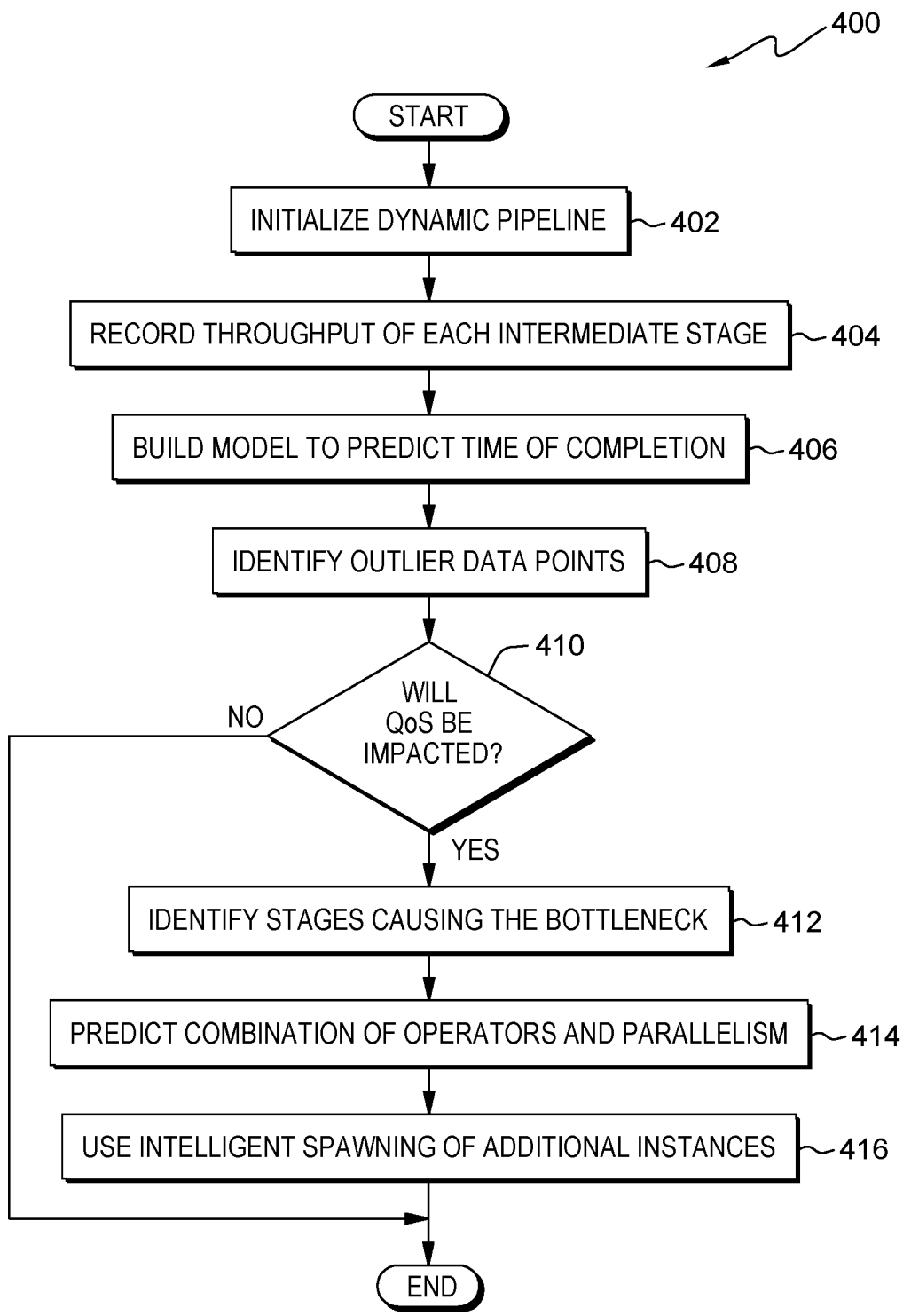
FIG. 4 is a flowchart depicting operational steps of the dynamic pipeline program, on a computing device within the distributed data processing environment of FIG. 1, for dynamically identifying and modifying the parallelism of a particular task in a pipeline, in accordance with an embodiment of the present invention.

FIG. 4 is a flow chart diagram of workflow 400 depicting operational steps for dynamic pipeline program 112 for seamlessly migrating data and index in distributed row-based database systems, for example, SQL, NoSQL, or any row-based source, where the data can be partitioned and processed in parallel, in accordance with at least one embodiment of the invention. In an alternative embodiment, the steps of workflow 400 may be performed by any other program while working with dynamic pipeline program 112. In an embodiment, dynamic pipeline program 112 initializes the dynamic pipeline. In an embodiment, dynamic pipeline program 112 records the throughput of each intermediate stage. In an embodiment, dynamic pipeline program 112 builds a model to predict the time of completion of each intermediate stage. In an embodiment, dynamic pipeline program 112 identifies outlier data points. In an embodiment, dynamic pipeline program 112 determines if QoS will be impacted. In an embodiment, dynamic pipeline program 112 creates a decision tree. In an embodiment, dynamic pipeline program 112 predicts the combination of operators and parallelism that would benefit from spawning additional instances. In an embodiment, dynamic pipeline program 112 use intelligent spawning of additional instances. In an embodiment, dynamic pipeline program 112 uses a machine learning decision tree model to predict an optimum configuration of the additional instances.

It should be appreciated that embodiments of the present invention provide at least for dynamically identifying and modifying the parallelism of a particular task in a pipeline. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

Dynamic pipeline program 112 initialize dynamic pipeline (step 402). At step 402, dynamic pipeline program 112 creates job execution optimization module 260, throughput monitor 220, and resources monitor 230 to start the dynamic pipeline optimization. Job execution optimization module 260 performs the actual addition and subtraction of pipeline stages to optimize the throughput, based on input from throughput monitor 220 and resources monitor 230. Throughput monitor 220 continuously measures the throughput of each stage in the pipeline, and sends the status to job execution optimization module 260. Resources monitor 230 continuously monitors the status of each resource necessary for the operation of the pipeline, and sends the status to job execution optimization module 260.

Dynamic pipeline program 112 records throughput of each intermediate stage (step 404). At step 404, dynamic pipeline program 112 uses job execution optimization module 260 to record the throughput of each operation stage in the pipeline based on the input from throughput monitor 220.

Dynamic pipeline program 112 builds model to predict time of completion (step 406). In an embodiment, dynamic pipeline program 112 uses machine learning algorithms to predict the expected time of completion of each pipeline stage, and computes the time of completion of the entire job given the actual throughput of each stage, the types of stages, and the actual throughput since the job began. In an embodiment, the algorithm is a simple linear regression models. In another embodiment, the algorithm is a deep-learning algorithm. In another embodiment, dynamic pipeline program 112 may use any other appropriate model as would be apparent to those skilled in the art to predict the expected time of job completion based on the characteristics of each pipeline stage or of the job.

Dynamic pipeline program 112 identifies outlier data points (step 408). In step 408, dynamic pipeline program 112 identifies stages where the predicted actual execution time differs from the expected execution time, or from the minimum theoretically possible execution time. In an embodiment, dynamic pipeline program 112 uses models to compute the optimal execution time of each stage that could be achieved under ideal conditions (i.e., if the throughput of the operator providing the data to its input was infinite). In an embodiment, these models can be machine learning models (e.g., other regression models). In another embodiment, these models can be simpler statistical formulae. In yet another embodiment, these models can be any other appropriate model as would be apparent to those skilled in the art to identify stages where the predicted actual execution time differs from the expected execution time, or from the minimum theoretical possible execution time.

In an embodiment, dynamic pipeline program 112 uses the calculated gap between predicted time of completion of each stage with that stage running in ideal conditions to identify outlier data points. In an embodiment, if dynamic pipeline program 112 determines that the difference between the actual execution time of a stage (and therefore of the job) and the expected execution time in ideal condition of the same stage (and therefore of the job) exceeds a threshold, then an outlier data point is detected. In an embodiment, the threshold is a system default. In another embodiment, the threshold may be set by the user of dynamic pipeline program 112.

Dynamic pipeline program 112 determines will QoS be impacted? (step 410). At step 410, if dynamic pipeline program 112 determines that QoS will be impacted, then dynamic pipeline program 112 uses intelligent spawning of intermediate operators to maintain QoS. The intelligent spawning process starts at step 412. if QoS will not be impacted, then dynamic pipeline program 112 ends.

Dynamic pipeline program 112 identifies stages causing the bottleneck (step 412). At step 412, if dynamic pipeline program 112 determines that QoS will be impacted, then dynamic pipeline program 112 determines which operator or operators in the stage should be spawned in multiple instances in order to improve the performance.

In an embodiment, dynamic pipeline program 112 determines which stage is causing the bottleneck by using a simple heuristic that assumes the first stage in the flow with a significant difference between the predicted execution time and expected execution time, or the stage prior to it, are the most probable bottleneck. In another embodiment, dynamic pipeline program 112 determines which stage is causing the bottleneck by identifying a pipeline stage where the output from that stage is less than the input to that stage. In yet another embodiment, dynamic pipeline program 112 uses a more advanced algorithm, using machine learning models trained from the history of past executions of similar jobs to give a more accurate prediction.

Dynamic pipeline program 112 predicts combination of operators and parallelism (step 414). At step 414, dynamic pipeline program 112 predicts the amount of parallelism that needs to be introduced. In an embodiment, job execution optimization module 260 uses the output of step 412 to predict which combination of operators and desired parallelism can lead to an optimal pipeline configuration to meet the QoS requirements. Based on the prediction of the decision tree, new instances of the operators in the pipeline are intelligently spawned or removed by job execution optimization module 260. In an embodiment, dynamic pipeline program 112 predicts the amount of parallelism that needs to be introduced from the input to output ratio. In another embodiment, dynamic pipeline program 112 predicts the amount of parallelism that needs to be introduced from past history of similar pipeline jobs. In an embodiment, the past history is determined from the machine learning models that are continuously retrained in both step 416 and step 518.

Dynamic pipeline program 112 uses intelligent spawning of additional instances (step 416). At step 416, dynamic pipeline program 112 uses intelligent spawning of additional instances on the stages identified in step 414. In an embodiment, dynamic pipeline program 112 uses machine learning decision tree models to determine the candidates of operators to spawn. These decision tree models are created in step 406 and are updated in this step and in step 518 below. If dynamic pipeline program 112 determines that increasing the parallelism of a stage increased the throughput, then dynamic pipeline program 112 will feed back the results to the machine learning decision tree models. At regular intervals, dynamic pipeline program 112 retrains those models with the latest historical results from both step 416 and step 518.

Details of the intelligent spawning of additional instances is explained in FIG. 5 below.

FIG. 5 is a flow chart diagram of workflow 500 depicting operational steps for dynamic pipeline program 112 for intelligent spawning of additional instances in accordance with at least one embodiment of the invention. In an alternative embodiment, the steps of workflow 500 may be performed by any other program while working with dynamic pipeline program 112. In an embodiment, dynamic pipeline program 112 identifies a limiting operation stage X. In an embodiment, dynamic pipeline program 112 determines if sufficient resources are available. In an embodiment, dynamic pipeline program 112 spawns a new stage X instance. In an embodiment, dynamic pipeline program 112 partitions data to the new stage X instance. In an embodiment, dynamic pipeline program 112 measures the throughput. In an embodiment, dynamic pipeline program 112 determines if the throughput has increased. In an embodiment, if the throughput has increased, dynamic pipeline program 112 spawns an additional new stage X instance. In an embodiment, if the throughput has not increased, dynamic pipeline program 112 removes the new stage X instance. In an embodiment, dynamic pipeline program 112 stores the current configuration. In an embodiment, dynamic pipeline program 112 trains a decision tree model.

It should be appreciated that embodiments of the present invention provide at least for dynamically identifying and modifying the parallelism of a particular task in a pipeline. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

Dynamic pipeline program 112 identifies limiting operation stage X (step 502). At step 502, dynamic pipeline program 112 determines that stage X is lagging in processing. In an embodiment, dynamic pipeline program 112 determines that stage X is lagging in processing using job execution optimization module 260, based on the input from throughput monitor 220.

Dynamic pipeline program 112 determines if sufficient resources available (step 504). At step 504, dynamic pipeline program 112 determines if sufficient resources are available to spawn new instances of stage X. In an embodiment, dynamic pipeline program 112 determines if sufficient resources are available using job execution optimization module 260, based on the input from resources monitor 230. If dynamic pipeline program 112 determines that sufficient resources are available to spawn new instances of stage X, then dynamic pipeline program 112 continues to step 506. If dynamic pipeline program 112 determines that sufficient resources are not available to spawn new instances of stage X, dynamic pipeline program 112 returns to the flow in FIG. 4. In an embodiment, sufficient resources includes processor resources. In another embodiment, sufficient resources available memory resources. In yet another embodiment, sufficient resources includes any combination of computer resources as may be necessary to create and manage the dynamic pipeline.

Dynamic pipeline program 112 spawns new stage X instance (step 506). At step 506, dynamic pipeline program 112 creates one or more new instances of stage X (upscales). In an embodiment, dynamic pipeline program 112 uses job execution optimization module 260 to add one or more new instances of stage X to the intermediate stage of the pipeline. In an embodiment, the number of new instances of stage X that dynamic pipeline program 112 creates is based on the performance calculations performed in step 414.

Dynamic pipeline program 112 partitions data to new stage X (step 508). In step 508, dynamic pipeline program 112 partitions data from stage X–1 to the new instance of stage X. In an embodiment, dynamic pipeline program 112 uses job execution optimization module 260 to partition data from stage X–1 to the new instance of stage X to increase the parallelism of the intermediate stage. The partitioning of data to the new stage X is described under FIG. 3b above.

Dynamic pipeline program 112 measures throughput (step 510). At step 510, dynamic pipeline program 112 measures the throughput of the overall pipeline to determine if the new instance of stage X has increased throughput. In an embodiment, dynamic pipeline program 112 uses job execution optimization module 260 to determine if the throughput of the pipeline has increased, based on input from throughput monitor 220.

Dynamic pipeline program 112 determines if throughput increased (step 512). At step 512, dynamic pipeline program 112 determines if the overall throughput of the pipeline has increased. In an embodiment, dynamic pipeline program 112 uses job execution optimization module 260 to determine if the throughput of the pipeline has increased, based on input from throughput monitor 220. If dynamic pipeline program 112 determines that the overall throughput of the pipeline has increased, dynamic pipeline program 112 returns to step 502 to determine if additional performance improvements are possible by adding additional parallel operators to the stage. If dynamic pipeline program 112 determines that the overall throughput of the pipeline has not increased, dynamic pipeline program 112 continues to step 514.

Dynamic pipeline program 112 removes new stage X instance (step 514). At step 514, if dynamic pipeline program 112 determines that the overall throughput of the pipeline has not increased, dynamic pipeline program 112 removes the new instance of stage X (downscales) to free resources. In an embodiment, dynamic pipeline program 112 uses job execution optimization module 260 to remove the new instance of stage X to free resources.

Dynamic pipeline program 112 stores current configuration (step 516). At step 516, since the throughput has increased, dynamic pipeline program 112 stores the current configuration of the dynamic pipeline to use as possible starting point for the next run of this pipeline.

Dynamic pipeline program 112 trains decision tree model (step 518). At step 518, based on the data from the above, dynamic pipeline program 112 trains a model to predict the behavior of an operator based on operator type, throughput, input operator, output operator, as captured from the previous steps. Based on these parameters gathered during this training, dynamic pipeline program 112 predicts which operators will benefit from upscaling or downscaling. In an embodiment, dynamic pipeline program 112 uses the decision tree model to predict the behavior of the dynamic pipeline for the data processing job. Therefore, rather than being randomly chosen, the future upscaling or downscaling predictions will be based on the created model. Dynamic pipeline program 112 then returns to FIG. 4.

Figure 6:
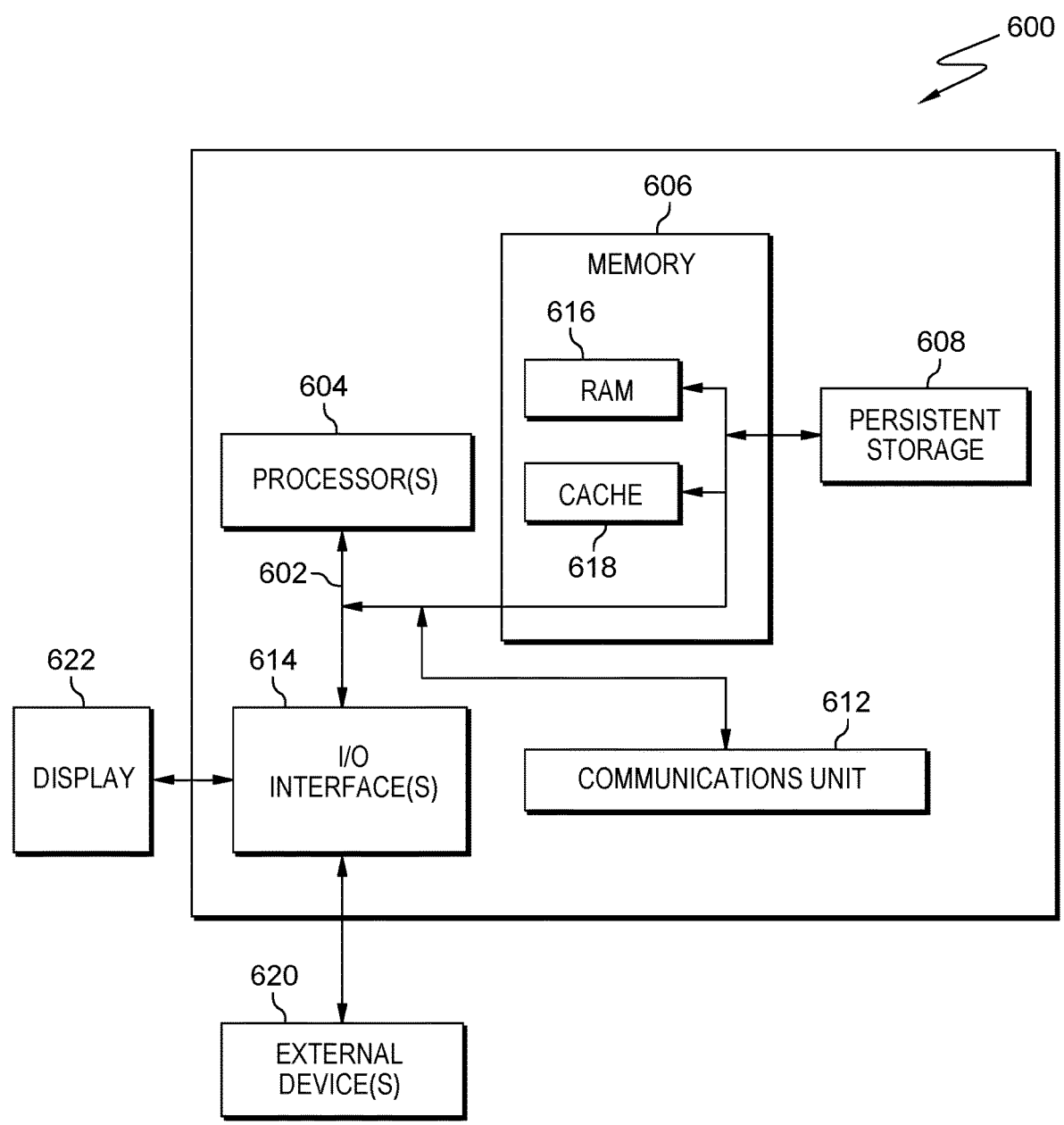
FIG. 6 depicts a block diagram of components of the computing devices executing the dynamic pipeline program within the distributed data processing environment of FIG. 1, in accordance with an embodiment of the present invention.

FIG. 6 is a block diagram depicting components of computing device 110 suitable for dynamic pipeline program 112, in accordance with at least one embodiment of the invention. FIG. 6 displays the computer 600, one or more processor(s) 604 (including one or more computer processors), a communications fabric 602, a memory 606 including a random-access memory (RAM) 616, and a cache 618, a persistent storage 608, a communications unit 612, I/O interfaces 614, a display 622, and external devices 620. It should be appreciated that FIG. 6 provides only an illustration of one embodiment and does not imply any limitations with regard to the environments in which different embodiments may be implemented. Many modifications to the depicted environment may be made.

As depicted, the computer 600 operates over the communications fabric 602, which provides communications between the computer processor(s) 604, memory 606, persistent storage 608, communications unit 612, and input/output (I/O) interface(s) 614. The communications fabric 602 may be implemented with an architecture suitable for passing data or control information between the processors 604 (e.g., microprocessors, communications processors, and network processors), the memory 606, the external devices 620, and any other hardware components within a system. For example, the communications fabric 602 may be implemented with one or more buses.

The memory 606 and persistent storage 608 are computer readable storage media. In the depicted embodiment, the memory 606 comprises a RAM 616 and a cache 618. In general, the memory 606 can include any suitable volatile or non-volatile computer readable storage media. Cache 618 is a fast memory that enhances the performance of processor(s) 604 by holding recently accessed data, and near recently accessed data, from RAM 616.

Program instructions for dynamic pipeline program 112 may be stored in the persistent storage 608, or more generally, any computer readable storage media, for execution by one or more of the respective computer processors 604 via one or more memories of the memory 606. The persistent storage 608 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

The communications unit 612, in these examples, provides for communications with other data processing systems or devices. In these examples, the communications unit 612 includes one or more network interface cards. The communications unit 612 may provide communications through the use of either or both physical and wireless communications links. In the context of some embodiments of the present invention, the source of the various input data may be physically remote to the computer 600 such that the input data may be received, and the output similarly transmitted, via the communications unit 612.

The I/O interface(s) 614 allows for input and output of data with other devices that may be connected to computer 600. For example, the I/O interface(s) 614 may provide a connection to external device(s) 620 such as a keyboard, a keypad, a touch screen, a microphone, a digital camera, and/or some other suitable input device. External device(s) 620 can also include portable computer readable storage media such as, for example, thumb drives, portable optical or magnetic disks, and memory cards. Software and data used to practice embodiments of the present invention, e.g., dynamic pipeline program 112, can be stored on such portable computer readable storage media and can be loaded onto persistent storage 608 via the I/O interface(s) 614. I/O interface(s) 614 also connect to a display 622.

Display 622 provides a mechanism to display data to a user and may be, for example, a computer monitor. Display 622 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for dynamically modifying the parallelism of a task in a pipeline, the computer-implemented method comprising:
   calculating, by one or more computer processors, an optimal execution time of each stage of a plurality of stages of a dynamic pipeline for a data processing job;
   using a machine learning decision tree model, determining, by one or more computer processors, an actual execution time of each stage of the plurality of stages of the dynamic pipeline for the data processing job;
   determining, by one or more computer processors, whether an actual time of completion of the data processing job will exceed a threshold, based on the actual execution time of each stage of the plurality of stages of the dynamic pipeline for the data processing job;

responsive to determining that the actual time of completion of the data processing job will exceed the threshold, creating, by one or more computer processors, one or more additional instances of the one or more of the plurality of stages of the dynamic pipeline for the data processing job, wherein the one or more additional instances of the one or more of the plurality of stages of the dynamic pipeline for the data processing job reduce the actual time of completion of the data processing job;

training, by one or more computer processors, the machine learning decision tree model to predict a behavior of the dynamic pipeline for the data processing job; and using the machine learning decision tree model, predicting, by one or more computer processors, an optimum configuration of the one or more additional instances of the one or more of the plurality of stages of the dynamic pipeline for the data processing job.

2. The computer-implemented method of claim 1, wherein determining, by one or more computer processors, whether the actual time of completion of the data processing job will exceed the threshold, based on the actual execution time of each stage of the plurality of stages of the dynamic pipeline for the data processing job, further comprises using a machine learning model to predict the actual time of completion of the data processing job.

3. The computer-implemented method of claim 1 further comprising:

determining, by one or more computer processors, one or more outlier data points, wherein the one or more outlier data points identify pipeline stages of the plurality of stages of the dynamic pipeline for the data processing job where the actual execution time differs from the optimal execution time; and determining, by one or more computer processors, if a predicted time of completion of the data processing job will exceed the threshold, based on the one or more outlier data points.

4. The computer-implemented method of claim 1, wherein creating, by one or more computer processors, the one or more additional instances of the one or more of the plurality of stages of the dynamic pipeline for the data processing job comprises:

determining, by one or more computer processors, whether a sufficient resources are available to spawn a first one or more additional instances of the one or more of the plurality of stages of the dynamic pipeline for the data processing job;

responsive to determining that the sufficient resources are available to spawn the first one or more additional instances of the one or more of the plurality of stages of the dynamic pipeline for the data processing job, spawning, by one or more computer processors, the first one or more additional instances of the one or more of the plurality of stages of the dynamic pipeline for the data processing job; and partitioning, by one or more computer processors, a pipeline data to the first one or more additional instances of the one or more of the plurality of stages of the dynamic pipeline for the data processing job.

5. The computer-implemented method of claim 4, wherein creating, by one or more computer processors, the one or more additional instances of the one or more of the plurality of stages of the dynamic pipeline for the data processing job further comprises:

measuring, by one or more computer processors, a throughput of the first one or more additional instances of the one or more of the plurality of stages of the dynamic pipeline for the data processing job;

determining, by one or more computer processors, whether the throughput of the first one or more additional instances of the one or more of the plurality of stages of the dynamic pipeline for the data processing job has increased; and responsive to determining that the throughput of the one or more additional instances of the one or more of the plurality of stages of the dynamic pipeline for the data processing job has increased, spawning, by one or more computer processors, a second one or more additional instances of the one or more of the plurality of stages of the dynamic pipeline for the data processing job.

6. The computer-implemented method of claim 4, wherein creating, by one or more computer processors, the one or more additional instances of the one or more of the plurality of stages of the dynamic pipeline for the data processing job further comprises:

measuring, by one or more computer processors, a throughput of the first one or more additional instances of the one or more of the plurality of stages of the dynamic pipeline for the data processing job;

determining, by one or more computer processors, whether the throughput of the first one or more additional instances of the one or more of the plurality of stages of the dynamic pipeline for the data processing job has increased;

responsive to determining that the throughput of the first one or more additional instances of the one or more of the plurality of stages of the dynamic pipeline for the data processing job has not increased, removing, by one or more computer processors, the first one or more additional instances of the one or more of the plurality of stages of the dynamic pipeline for the data processing job; and storing, by one or more computer processors, a current configuration of the dynamic pipeline for the data processing job.

7. A computer program product for dynamically modifying the parallelism of a task in a pipeline, the computer program product comprising:

one or more computer-readable storage devices and program instructions stored on the one or more computer readable storage devices, the stored program instructions comprising:

program instructions to calculate an optimal execution time of each stage of a plurality of stages of a dynamic pipeline for a data processing job;

program instructions to determine, using a machine learning decision tree model, an actual execution time of each stage of the plurality of stages of the dynamic pipeline for the data processing job;

program instructions to determine whether the actual time of completion of the data processing job will exceed a threshold, based on the actual execution time of each stage of the plurality of stages of the dynamic pipeline for the data processing job;

responsive to determining that the actual time of completion of the data processing job will exceed the threshold, program instructions to create one or more additional instances of the one or more of the plurality of stages of the dynamic pipeline for the data processing job, wherein the one or more additional instances of the one or more of the plurality of stages of the dynamic pipeline for the data processing job reduce the actual time of completion of the data processing job;

program instructions to train, by one or more computer processors, the machine learning decision tree model to predict a behavior of the dynamic pipeline for the data processing job; and using the machine learning decision tree model, program instructions to predict, by one or more computer processors, an optimum configuration of the one or more additional instances of the one or more of the plurality of stages of the dynamic pipeline for the data processing job.

8. The computer program product of claim 7, wherein program instructions to determine whether the actual time of completion of the data processing job will exceed the threshold, based on the actual execution time of each stage of the plurality of stages of the dynamic pipeline for the data processing job, further comprises using a machine learning model to predict the actual time of completion of the data processing job.

9. The computer program product of claim 7 further comprising:

program instructions to determine one or more outlier data points, wherein the one or more outlier data points identify pipeline stages of the plurality of stages of the dynamic pipeline for the data processing job where the actual execution time differs from the optimal execution time; and program instructions to determine if a predicted time of completion of the data processing job will exceed the threshold, based on the one or more outlier data points.

10. The computer program product of claim 7, wherein program instructions to create the one or more additional instances of the one or more of the plurality of stages of the dynamic pipeline for the data processing job comprises:

program instructions to determine whether a sufficient resources are available to spawn a first one or more additional instances of the one or more of the plurality of stages of the dynamic pipeline for the data processing job;

responsive to determining that the sufficient resources are available to spawn the first one or more additional instances of the one or more of the plurality of stages of the dynamic pipeline for the data processing job, program instructions to spawn the first one or more additional instances of the one or more of the plurality of stages of the dynamic pipeline for the data processing job; and program instructions to partition a pipeline data to the first one or more additional instances of the one or more of the plurality of stages of the dynamic pipeline for the data processing job.

11. The computer program product of claim 10, wherein program instructions to create the one or more additional instances of the one or more of the plurality of stages of the dynamic pipeline for the data processing job further comprises:

program instructions to measure a throughput of the first one or more additional instances of the one or more of the plurality of stages of the dynamic pipeline for the data processing job;

program instructions to determine whether the throughput of the first one or more additional instances of the one or more of the plurality of stages of the dynamic pipeline for the data processing job has increased; and responsive to determining that the throughput of the first one or more additional instances of the one or more of the plurality of stages of the dynamic pipeline for the data processing job has increased, program instructions to spawn a second one or more additional instances of the one or more of the plurality of stages of the dynamic pipeline for the data processing job.

12. The computer program product of claim 10, wherein program instructions to create the one or more additional instances of the one or more of the plurality of stages of the dynamic pipeline for the data processing job further comprises:

program instructions to measure a throughput of the first one or more additional instances of the one or more of the plurality of stages of the dynamic pipeline for the data processing job;

program instructions to determine whether the throughput of the first one or more additional instances of the one or more of the plurality of stages of the dynamic pipeline for the data processing job;

responsive to determining that the throughput of the first one or more additional instances of the one or more of the plurality of stages of the dynamic pipeline for the data processing job has not increased, program instructions to remove the first one or more additional instances of the one or more of the plurality of stages of the dynamic pipeline for the data processing job; and program instructions to store a current configuration of the dynamic pipeline for the data processing job.

13. A computer system for dynamically modifying the parallelism of a task in a pipeline, the computer program product comprising:

one or more computer processors;

one or more computer-readable storage media; and program instructions stored on the one or more computer readable storage media for execution by at least one of the one or more computer processors, the stored program instructions comprising:

program instructions to calculate an optimal execution time of each stage of a plurality of stages of a dynamic pipeline for a data processing job;

using a machine learning decision tree model, program instructions to determine an actual execution time of each stage of the plurality of stages of the dynamic pipeline for the data processing job;

program instructions to determine whether the actual time of completion of the data processing job will exceed a threshold, based on the actual execution time of each stage of the plurality of stages of the dynamic pipeline for the data processing job;

responsive to determining that the actual time of completion of the data processing job will exceed the threshold, program instructions to create one or more additional instances of the one or more of the plurality of stages of the dynamic pipeline for the data processing job, wherein the one or more additional instances of the one or more of the plurality of stages of the dynamic pipeline for the data processing job reduce the actual time of completion of the data processing job;

program instructions to train, by one or more computer processors, the machine learning decision tree model to predict a behavior of the dynamic pipeline for the data processing job; and using the machine learning decision tree model, program instructions to predict, by one or more computer processors, an optimum configuration of the one or more additional instances of the one or more of the plurality of stages of the dynamic pipeline for the data processing job.

14. The computer system of claim 13, wherein program instructions to determine whether the actual time of completion of the data processing job will exceed the threshold, based on the actual execution time of each stage of the plurality of stages of the dynamic pipeline for the data processing job, further comprises using a machine learning model to predict the actual time of completion of the data processing job.

15. The computer system of claim 13 further comprising,
program instructions to determine one or more outlier data points, wherein the one or more outlier data points identify pipeline stages of the plurality of stages of the dynamic pipeline for the data processing job where the actual execution time differs from the optimal execution time; and
program instructions to determine if a predicted time of completion of the data processing job will exceed the threshold, based on the one or more outlier data points.

16. The computer system of claim 13, wherein program instructions to create the one or more additional instances of the one or more of the plurality of stages of the dynamic pipeline for the data processing job comprises:
program instructions to determine whether a sufficient resources are available to spawn a first one or more additional instances of the one or more of the plurality of stages of the dynamic pipeline for the data processing job;
responsive to determining that the sufficient resources are available to spawn the first one or more additional instances of the one or more of the plurality of stages of the dynamic pipeline for the data processing job, program instructions to spawn the first one or more additional instances of the one or more of the plurality of stages of the dynamic pipeline for the data processing job; and
program instructions to partition a pipeline data to the first one or more additional instances of the one or more of the plurality of stages of the dynamic pipeline for the data processing job.

17. The computer system of claim 16, wherein program instructions to create the one or more additional instances of the one or more of the plurality of stages of the dynamic pipeline for the data processing job further comprises:
program instructions to measure a throughput of the first one or more additional instances of the one or more of the plurality of stages of the dynamic pipeline for the data processing job;
program instructions to determine whether the throughput of the first one or more additional instances of the one or more of the plurality of stages of the dynamic pipeline for the data processing job has increased; and
responsive to determining that the throughput of the first one or more additional instances of the one or more of the plurality of stages of the dynamic pipeline for the data processing job has increased, program instructions to spawn a second one or more additional instances of the one or more of the plurality of stages of the dynamic pipeline for the data processing job.

18. The computer system of claim 16, wherein program instructions to create the one or more additional instances of the one or more of the plurality of stages of the dynamic pipeline for the data processing job further comprises:
program instructions to measure a throughput of the first one or more additional instances of the one or more of the plurality of stages of the dynamic pipeline for the data processing job;
program instructions to determine whether the throughput of the first one or more additional instances of the one or more of the plurality of stages of the dynamic pipeline for the data processing job; responsive to determining that the throughput of the first one or more additional instances of the one or more of the plurality of stages of the dynamic pipeline for the data processing job has not increased, program instructions to remove the first one or more additional instances of the one or more of the plurality of stages of the dynamic pipeline for the data processing job; and
program instructions to store a current configuration of the dynamic pipeline for the data processing job.

* * * * *